US012210907B2

(12) United States Patent
Lu et al.

(10) Patent No.: US 12,210,907 B2
(45) Date of Patent: Jan. 28, 2025

(54) DECENTRALIZED DISTRIBUTED COMPUTING ENVIRONMENT

(71) Applicant: Cortic Technology Corp., Port Coquitlam (CA)

(72) Inventors: Ye Lu, Coquitlam (CA); Him Wai Ng, Port Coquitlam (CA); Zhen Wang, Vancouver (CA)

(73) Assignee: Cortic Technology Corp., Port Coquitlam (CA)

( * ) Notice: Subject to any disclaimer, the term of this patent is extended or adjusted under 35 U.S.C. 154(b) by 522 days.

(21) Appl. No.: 17/672,664

(22) Filed: Feb. 15, 2022

(65) Prior Publication Data

US 2023/0259400 A1    Aug. 17, 2023

(51) Int. Cl.
   *G06F 9/50* (2006.01)
(52) U.S. Cl.
   CPC ............ *G06F 9/5038* (2013.01); *G06F 9/505* (2013.01); *G06F 9/5072* (2013.01)
(58) Field of Classification Search
   CPC ........ G06F 1/329; G06F 9/4843; G06F 9/505; G06F 9/5083
   See application file for complete search history.

(56) References Cited

U.S. PATENT DOCUMENTS

| | | | | |
|---|---|---|---|---|
| 7,957,999 B2* | 6/2011 | Stoxen | ........... | G06Q 10/063114 705/7.15 |
| 8,978,036 B2* | 3/2015 | Fletcher | ................. | H04L 67/59 718/104 |
| 9,244,652 B1* | 1/2016 | Ellis | ...................... | G06F 9/5066 |
| 9,262,228 B2* | 2/2016 | Bond | ..................... | G06F 9/5038 |
| 11,288,091 B2* | 3/2022 | Laschinger | .......... | G06F 9/4843 |
| 11,334,385 B2* | 5/2022 | Osmond | ................ | G06F 9/547 |
| 11,416,294 B1* | 8/2022 | Davis | .................... | G06F 9/5005 |
| 11,924,060 B2* | 3/2024 | Smith | .................... | H04L 67/61 |

* cited by examiner

*Primary Examiner* — Andy Ho
(74) *Attorney, Agent, or Firm* — Javalon Law, PC

(57) ABSTRACT

In various embodiments, software architecture and network topology are provided to implement a decentralized distributed computing environment. In some embodiments, the novel network topology is configured as a mesh network such that individual hub devices are connected directly or indirectly with each other. An individual worker can be added to or removed from this network via connection with the hub devices without affecting the rest of the workers in the network and without user intervention or knowledge. In those embodiments, a software package is deployed on a given hub device to enable the hub device to perform network discovery, communicating with other hub devices in the decentralized distributed computing environment, determine a load balance for the decentralized distributed computing environment, distribute a task to an available worker in the decentralized distributed computing environment, manage one or more functional modules in the decentralized distributed computing environment, and/or any other functionalities.

18 Claims, 8 Drawing Sheets

DECENTRALIZED DISTRIBUTED COMPUTING ENVIRONMENT

FIELD OF THE INVENTION

This invention relates to software and network topology implementing a decentralized distributed computing environment.

BACKGROUND OF THE INVENTION

Distributed computing (or distributed processing) is a technique of linking together multiple computer nodes over a network into a cluster, to share data and to coordinate processing power. A distributed system is typically referred to a system whose components are located on different networked computers, which communicate and coordinate their actions by passing messages to one another from any system. The components interact with one another in order to achieve a common goal. Three significant characteristics of distributed system are: concurrency of components, lack of a global clock, and independent failure of components A computer program that runs within a distributed system is called a distributed program (and distributed programming is the process of writing such programs). There are many different types of implementations for the message passing mechanism, including pure HTTP, RPC-like connectors and message queues.

Distributed computing also refers to the use of distributed systems to solve computational problems. In distributed computing, a problem is divided into many tasks, each of which is solved by one or more computers, which communicate with each other via message passing.

SUMMARY OF THE INVENTION

In various embodiments, software architecture and network topology are provided to implement a novel decentralized distributed computing environment. A motivation for implementing this novel decentralized computing environment is to facilitate adding or removing functional modules without affecting the rest of components in the decentralized distributed computing environment. Another motivation is to provide a system to a user such that the user can write programs using various components in the decentralized distributed computing environment without realizing how these components communicate with each other and/or how various commands in the user program are distributed for performance in the decentralized distributed computing environment. That is, a motivation for the novel decentralized distributed computing environment in accordance with the present disclosure is to enable the user to approach programming from a functional perspective in terms of what functions the program tries to achieve rather than from a perspective in terms of how to implement these functions. In this sense, various system level task distributing and communicating are controlled and implemented by various layers within the decentralized distributed computing environment without user intervention.

In various embodiments, a decentralized distributed computing network topology is provided to enable implementation of functional programs in accordance with the present disclosures. A client program may be referred to a program where one or more devices are employed to achieve one or more functions. For example, in various embodiments, a client program is provided to employ various devices in the decentralized distributed computing environment such that these devices work together to achieve a functional goal. The functional goal is defined by the user during a programming phase of the client program. The functional goal in those embodiments involve using artificial intelligence (A.I.) based routines to achieve the function goal defined in the program by the user.

For instance, in one embodiment, the novel network topology enables the user to program a camera and an LED light in the decentralized distributed computing environment such that the LED light is controlled to change color based on the detected mood of a person captured by the camera. In that instance, the novel network topology includes multiple hub devices configured to host various components called workers in the network. The functional goal (e.g., changing LED light color based on the detected mood of the person) is divided into multiple commands each corresponding to one or more tasks performable by the workers in the network.

In some embodiments, the novel network topology is configured as a mesh network such that individual hub devices are connected directly or indirectly with each other. An individual worker can be added to or removed from this network without affecting the rest of the workers in the network and without user intervention or knowledge. In this way, the novel network topology provides a flexible distributed computing environment for achieving the functional goal defined in the user program. This network topology hides system level details from the user such that the user may view the various workers in the network as being in one place rather than scattered across the network.

In various embodiments, a software package is provided. In those embodiments, the software package is deployed on a given hub device in the decentralized distributed computing environment. The software package enables the hub device to perform network discovery, communicating with other hub devices in the decentralized distributed computing environment, determine a load balance for the decentralized distributed computing environment, distribute a task to an available worker in the decentralized distributed computing environment, manage one or more functional modules in the decentralized distributed computing environment, and/or any other functionalities. As used herein, a functional module is referred to a self-contained module having a software or routines that can complete one or more functions corresponding to the functional module. For example, in various embodiments, a computer vision module is provided such that the computer vision module provides multiple services such as a vision input service, a vision process service, a vision render service, and/or any other services. In those embodiments, the computer vision module also comprises multiple worker software configured to perform specific tasks for achieving the functions of the computer vision module. For instance, the worker software includes image capture software, video capture software, face detection software, face recognition software, pose estimation software, and/or another software. One or more of such software, for example face recognition and pose estimation, involve A.I. based routines for good performance. In those embodiments, the computer vision module includes the A.I. based routines (or knowledge how to perform these A.I. base routines). In this sense, the functional modules in accordance with the present disclosure are self-contained in the software package such that one functional module does not depend on another functional module in the software package.

Other objects and advantages of the invention will be apparent to those skilled in the art based on the following drawings and detailed description.

DETAILED DESCRIPTION

Figure 1:
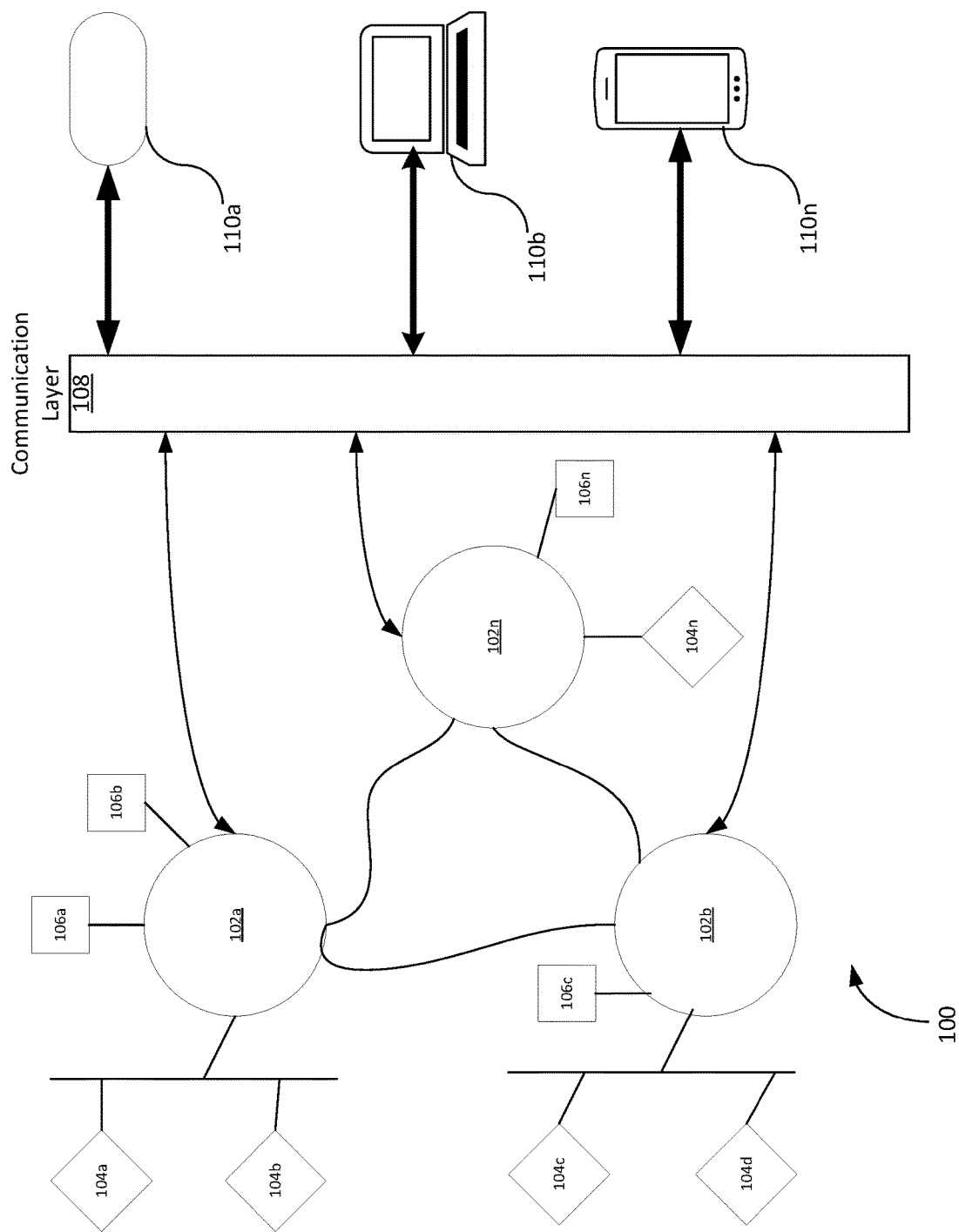
FIG. 1 illustrates one example decentralized distributed computing environment 100 in accordance with the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. For a particular repeated reference numeral, cross-reference may be made for its structure and/or function described and illustrated herein.

As computing capability of a control system to control an end device is typically provided by one or more electronic processors, for users of such a control system, it is required that they possess adequate programming language skills in order to design specific applications for controlling an end device. Users of a control system may be required to have dedicated training in one or more programming languages in order to possess adequate programming skills to design applications of a control system, which has become one of the major obstacles for kids to learn and practice design of control systems at an early age. Designing applications for control systems using complex programming languages is also a time-consuming and error-prone process for novice programmers as the syntax of a programming language may be complicated for novice programmers. Moreover, it may not be necessary for functional designers of such a control system to be skilled in complex programming languages in order to design applications in the control system. For functional designers of such as a control system, the goal is to provide a functional solution of a specific application using the control system without spending time in going through details of the programming language used in the control system.

One motivation behind the present disclosure is to enable a user to achieve a functional goal through programming quickly and effectively. A decentralized distributed computing environment is designed to provide an array of devices/components to the user for programming. Several considerations are part of this motivation. A first consideration is that many different kinds of devices/components are now available but with somewhat limited resources and power as compared to a desktop computer or a server computer. For example, many IoT devices such as smart speakers, smart lights, smart cameras now have processing capabilities beyond just performing functions such as playing sound, emitting lights, and capturing images. These IoT devices may be employed in the decentralized distributed computing environment in accordance with the present disclosure to provide various capabilities to the user.

However, a challenge for making such devices available for the user to program to achieve a functional goal is that these devices are typically scattered around in a real-world environment and may or may not be hosted by a single hosting computing device. For example, in a real-world environment, one can find a couple of computers such as a laptop and desktop in his/her home, a few smart computing devices such as smart phones, and tablet computers in his/her home, and an array of smart IoT devices such as smart speakers, smart lamps, smart cameras, smart thermostats, and or any other smart IoT devices in his/her home. These devices would certainly provide capabilities to the user to achieve, for example, a functional goal to change a color of a light by a smart lamp in his/her home according to the user mood. That is, in that example, the user would have the camera capture his/her images from time to time, a desktop computer analyzes the images to determine the mood of the user at a given time, and the desktop computer control the smart lamp to change the color of the light based on the mood.

However, for the user to achieve this simple functional goal using devices already in his/her home, the user would need to install quite a few software packages such as an A.I. based image analysis routine, face recognition/determination routine, IoT control routine and/or any other software packages on the desktop computer. The user also would need to set up a network not only to connect these devices but also need to set up a communication interface for these devices to communicate. Even if the user is able to achieve all of these, the capabilities enabled by the user is limited to achieve the functional goal of changing the color of the smart lamp based on the user's mood. The user would set up very differently to achieve other functional goals such as play a welcome sound to a guest based on an identify of the guest.

Thus, the consideration mentioned above is to enable the user to able to achieve many different functional goals using the devices available in his/her environment effectively. Another consideration is that it is desired to provide a user-friendly programming environment to the user to achieve functional goals using these devices. For example, it is desired not to inundate the user with knowledge how various tasks for achieving a particular functional goal depend on each other. For example, in the case of changing a color of the light based on the user mood, it is desired that the user would not need to set up many different dependencies and contingencies to achieve this goal. As far as the user concerns, he or she would just want to issue a command to control the smart camera to capture an image of the user from time to time, and another command to control the light to change its color based on a mooed detected in an image of the user. It is desired that the user should be able to quickly set this up to achieve this functional goal without having to specify, for example, how to handle a timeout waiting on the camera to provide an updated image or the lamp is unreachable.

Thus, the motivation is to provide processing capabilities at system or distributed computing environment level to enable the user to achieve different functional goals treating the distributed environment as if it were a "single" system connected to different nodes. It is desired that this "single" system on its own achieves system level load balancing, task distribution, device discovery, device communication and/or any other system level "plumbing". That is, it is desired that the decentralized distributed computing environment can be viewed as a magic box by the user to achieve many functional goals with lots of possibilities.

Central to implementation of this "single" system is a novel software stack known as middleware. As will be described in greater details, this novel software stack can be installed on a given node in the decentralized distributed computing environment in accordance with the present disclosure. The middleware is responsible for automatically discovering nodes in the decentralized distributed computing environment, routing and marshalling messages to target nodes, and load balancing the computation across the nodes in the decentralized distributed computing environment. The middleware allows developers to write any distributed application with a simple command-based interface. This programming interface does not make any explicit assumptions about hardware and network structures, so developers do not need to hard code any hub device information within decentralized distributed computing environment. That is, this middleware provides a programming interface to allow a developer to be able to write a program as if the decentralized distributed computing environment were a "single" system. The middleware automatically finds the best device (in the sense of having the lowest computational load) capable of performing the required task, schedules a job on that device, marshals and sends over the input data for the job, and returns the result back to the requesting node as soon as the job is completed by a worker. Applications developed using this middleware are portable. They can easily migrate to any decentralized distributed computing environment as long as there is at least one device capable of performing each of the required tasks in the applications.

FIG. 1 illustrates one example decentralized distributed computing environment 100 in accordance with the present disclosure. As can be seen, the decentralized distributed computing environment 100 includes multiple hub devices such as hub devices 102a, 102b and 102n shown in this example. It should be understood although three hub devices are illustrated in this example, this is not intended to be limiting the decentralized distributed computing environment in accordance with the present disclosure. It should be understood that the decentralized distributed computing environment in accordance with the present disclosure may include more or less than three hub devices in some other examples. As used herein a hub device is referred to a computing device having a capability to run an operating system such as Linux, Windows, Mac OS, Unix, HPUX, and/or any other operating system. Examples of the hub device may include a Raspberry Pi device, a desktop computer, a laptop computer, a tablet computer, and/or any other qualified computing devices. As will be described, the hub device is a host to host one or more worker components and has a novel software package. Thus, any computing device that is capable of such can be considered as a hub device. In accordance with the present disclosure, the hub devices in the decentralized distributed computing environment 100 may be homogenous, or heterogenous. For example, it is contemplated that the hub devices 102a, 102b, 102n are Raspberry Pi 4B devices. However, this is not necessarily the only case. As mentioned, the hub devices can be of different types—for example, hub device 102a is a laptop computer, hub device 102b is a desktop computer, and hub device 102c is a Raspberry Pi device. Other examples are contemplated. It should be understood that, in some examples, a Raspberry Pi device can also serve as a worker device. In those examples, without limitation, the Raspberry Pi device is connected to a hub device, for example, such as desktop computer.

In accordance with the present disclosure, a given hub device, such as the hub device 102a, is operatively connected with one or more of a local processing device such as devices 104a, 104b, 104c, 104d, or 104n shown in this example. A given local processing device, such as device 104a, as used herein, is referred to a device connectable to a hub device via a physical connection such as a BUS or wire. Examples of the given local processing device may include a CPU, a GPU, an integrated Webcam in the hub device, a microphone of the hub device, a speaker of the hub device, a display of the hub device, and/or any other local processing device.

In accordance with the present disclosure, a given hub device, such as the hub device 102a, is operatively connected with one or more of a remote processing device, such as devices 106a, 106b, 106c and 106n shown in this example. As used herein, a remote processing device is referred to as a device is connectable to a given hub device via a network. In various embodiments, the remote processing device in accordance with the present disclosure has specific capabilities and has somewhat limited computing resources as compared to the given hub device. However, this is not necessarily the only case. Examples of the remote processing device may include a MCU, an IoT device, a smart phone, and/or any other remote processing device. As used herein, a local or remote processing device is referred to as a worker component. Thus, a worker component in the present disclosure is connected with (either physically or remotely) to a corresponding hub device. The worker component provides appropriate capabilities for task completions in the decentralized distributed computing environment.

As can be seen, the decentralized distributed computing environment 100 includes a communication layer 108, which is referred to a layer representing communications among the hub devices and client computing device ("nodes") in the decentralized distributed computing environment. This layer serves a communication channel among various nodes in the decentralized distributed computing environment. As will be described later, one example implementation of the communication layer 108 is a MQTT-based message protocol. In accordance with the present disclosure, a mesh network among the hub devices can be established via the communication layer 108.

As also can be seen that the individual hub devices 102a, 102b and 102n can communicate among themselves directly via any suitable communication channels. For example, the hub device 102a may communicate with the hub device 102b via a wireless channel such as bluetooth, and communicate with the hub device 102n also via the wireless channel; and the hub device 102b may communicate with the hub device 102n via local WIFI network. For example, the hub device 102a may discover about hub device 102b through the direct communication between the two.

As still can be seen, the decentralized distributed computing environment 100 includes one or more client computing devices, such as devices 110a, 110b or 110n shown in this example. A given client computing device is configured to issue a command for completion by a suitable device in the decentralized distributed computing environment 100. The given client computing device can send the command to the communication layer 108, which as will be described can send the command to an appropriate hub device for completion. The client computing device can receive data or completion results from the communication layer 108. Examples of the given client computing device may include a desktop computer, a laptop computer, a cloud client (such as a terminal), and/or any other AIoT devices.

Figure 2:
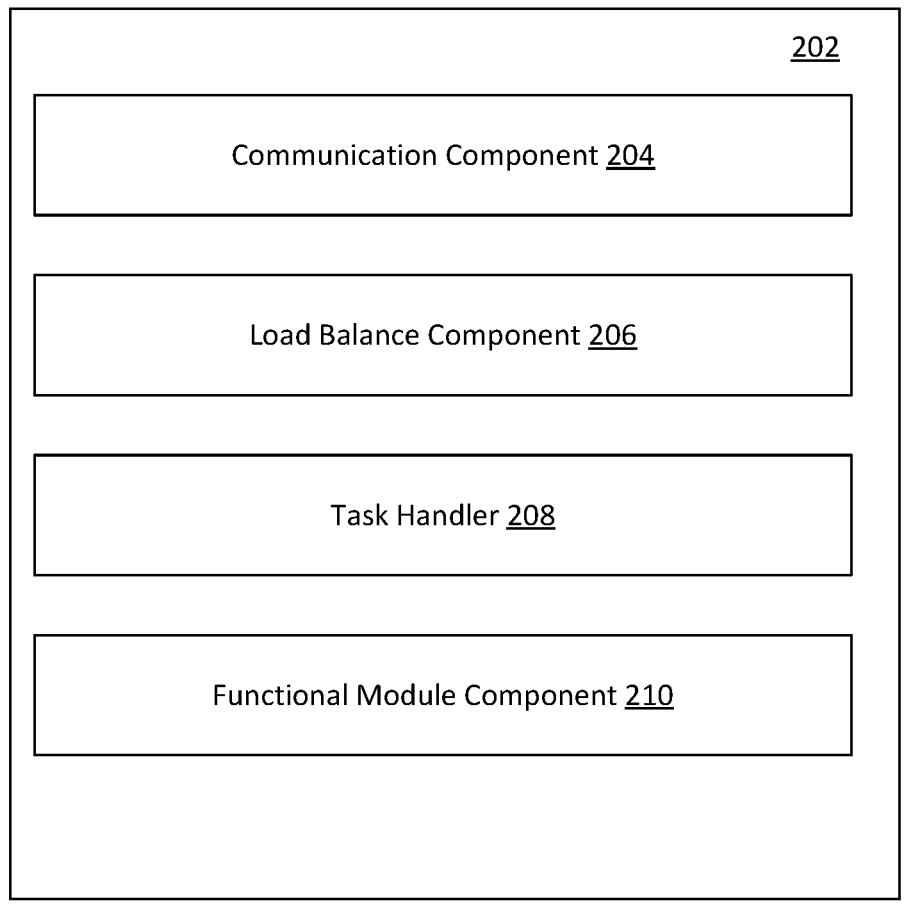
FIG. 2, illustrates an example of a processor implementing a software stack in any one of the hub devices shown in FIG. 1.

With the decentralized distributed computing environment in accordance with the present disclosure having been generally described, attention is now directed to FIG. 2, where an example of a processor implemented in any one of the hub devices shown in FIG. 1 is illustrated. In this Fig, an example processor 202 is illustrated. The processor 202 is configured to read instructions and execute the instructions to implement various functional components shown in FIG. 2 including a communication component 204, a load balance component 206, a task handler 208, a functional module component 210, and/or any other components.

It should be understood that processor 202 shown in FIG. 2 may be in any one of the hub devices 102a, 102b or 102n shown in FIG. 1. In some embodiments, functional components shown in FIG. 2 are provided by a novel software package installed on the hub devices 102a, 102b and 102n. In those embodiments, the software package is referred to as a middleware implementing the decentralized distributed computing environment 100 to enable a user to achieve different functional goals using various worker components in the decentralized distributed computing environment 100.

It should also be understood that the various components shown in this example are merely illustrative. That is, the division or inclusion of these components in the processor 202 should not be understood as limiting a processor implementing the aforementioned middleware in accordance with the present disclosure. It is understood that some of the components shown in FIG. 2 may be combined or eliminated in some other examples. For instance, the distributed environment management component 212 and the worker management component 214 may be combined to form a management component in some other examples.

The communication component 204 is configured to facilitate communications within the decentralized distributed computing environment 100. In general, there are two kinds of communications within decentralized distributed computing environment 100. The first kind involves communications between a given hub device and another hub device. The second kind of communications involves communications between a given hub device to a client computing device and vice versa. For understanding the communications facilitated by a communication component 204, a functional design implementing the decentralized distributed computing environment 100 is illustrated in FIG. 3.

Figure 3:
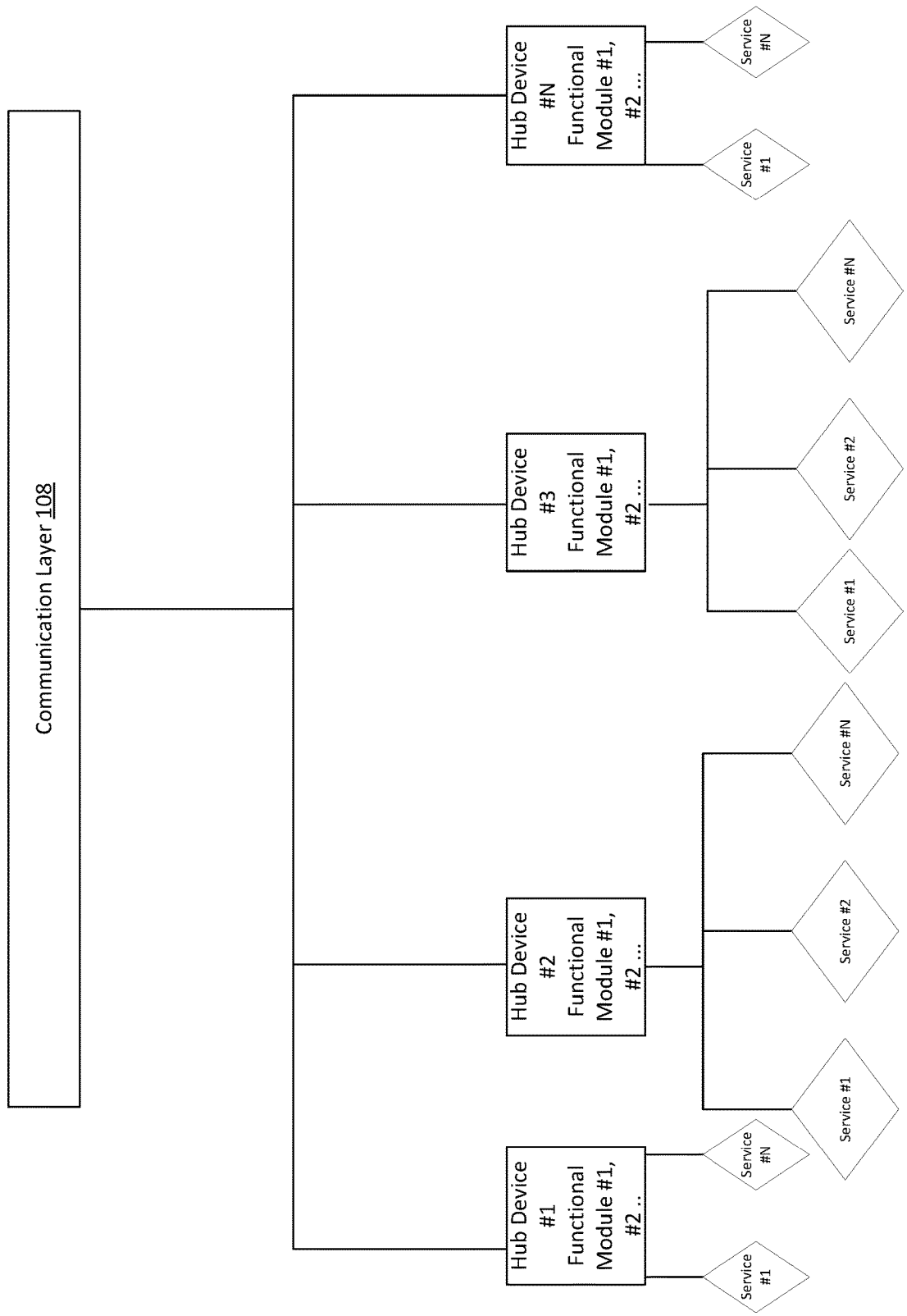
FIG. 3 illustrates a functional design implementing the decentralized distributed computing environment shown in FIG. 1.

Attention is now directed to FIG. 3. As can be seen, the hub devices such as 102a-n shown in FIG. 1 are connected via the communication layer 108. In this example, the hub devices in the decentralized distributed computing environment are illustrated hub devices #1, #2, #3, and #N. As can be seen, individual hub devices are configured with one or more of a functional module, such as functional modules #1, #2, and so on. As used herein, a functional module is referred to as a self-contained software package for achieving one or more logically related functional goals. Different functional modules may be independent from each other such that each of the functional modules has its own list of supporting software without having to worry about version conflicts. Examples of the functional modules include computer vision module, voice module, natural language processing (NLP) module, robotic module, smart home module, and/or any other functional modules. As will be described in connection with functional module component 210, various functional modules installed to a given hub device in the decentralized distributed computing environment via the functional module component 210 and are managed by the functional module component 210.

For describing the communications facilitated by the communication component 204, focus is now on the hub devices shown in FIG. 3. Reference is also made to FIG. 1. As can be seen in the example shown in FIG. 3, hub device #1 is configured with functional modules #1, #2, #3 . . . and hub device #2 is also configured with functional modules #1, #2, #3 . . . . In one embodiment, both hub devices #1 and #2 are installed with a software package known as middleware, which, for example, includes a computer vision module, a voice module, a NLP module, a robot control module and a smart home control module. Using that example as illustration, thus not intended to be limiting, the computer vision module on hub device #1 and vision module on hub device #2 are decoupled from each other. Other above-mentioned modules on hub devices #1 and #2 are likewise decoupled from each other. In this example, the vision modules on hub devices #1 and #2 each includes software to facilitate vision-related tasks such as depthAI Gen2 pipeline. In this example, the voice modules on hub devices #1 and #2 each includes software to facilitate speech recognition and speech generation tasks. In this example, the NLP modules on hub devices #1 and #2 each includes natural language processing software to facilitate tasks related to language processing. In this example, the smart home modules on hub devices #1 and #2 each includes software to facilitate tasks related to controlling one or more smart home devices.

In one embodiment, the vision modules on hub devices #1 and #2 are functionally identical; and other types of above-mentioned modules are also the same on hub devices #1 and #2. In decentralized distributed computing environment 100, for instance, the vision module on hub device #1 and smart home control module on hub device #2 are to communicate each other to cooperate to accomplish user defined functional goals or tasks. For example, in the case of controlling a smart lamp color based on a detected mood of the user, the vision module on hub device #1, which is connected with a smart camera, and the smart home control module on hub device #2, which is connected with the smart lamp, are to communicate with each other. For example, as illustration thus non-limiting, the vision module on hub device #1, using the smart camera, is controlled to perform commotion recognition to obtain a detected mood of the user at a given moment, and pass information indicating the detected mood to the smart home control module on hub device #2 to cause the smart lamp to change its color based on the detected mood.

Many design choices to facilitate such a communication scenario are considered by the inventor(s) of the present disclosure. One design choice is adopted by virtue of its low latency and efficiency. This design choice uses a publish-subscribe communication protocol such as Message Queuing Telemetry Transport (MQTT) to facilitate the above-mentioned inter-module communications on hub devices in the decentralized distributed computing environment 100. A publish-subscribe communication protocol is a messaging protocol where senders of messages, called publishers categorize published messages into classes without knowledge of which subscribers (or receivers of the messages), if any, there may be. Similarly, subscribers express interest in one or more classes and only receive messages that are of interest, without knowledge of which publishers, if any, there are. In such a communication protocol, a given publisher does not directly send a message to a particular subscriber. Instead, the given publisher puts the message in a channel or queue such that any subscriber of that channel or queue may read the message.

In one example implementation, the communication component 204 is configured to implement MQTT such that each hub device in the decentralized distributed computing environment 100 implements a respective MQTT broker. Thus, in the example above, as being facilitated by the communication component 204, the vision module on hub device #1 can categorize and send the information indicating the detected user mood at the given moment to a MQTT broker installed on hub device #1, which can send the information to other MQTT brokers installed on hub devices in the decentralized distributed computing environment 100 including hub device #2. The smart home control module on hub device #2 is configured to subscribe to the information indicating the detected mood of the user and thus can read such information sent from hub device #1.

In one example implementation of communication component 204, a community version of a "EMQ X" broker is used. In that implementation, hub devices in the decentralized distributed computing environment 100, after installed with the communication component 204 via the middleware, they can automatically discover each other and form a mesh network. Because individual hub device advertises its own MQTT broker in the decentralized distributed computing environment 100, connecting to any of these brokers is equivalent to connecting to the entire mesh network. In implementation, as so designed, decentralized distributed computing environment 100 is robust to tolerate device failures. In this design, any hardware and software error on a particular hub device is localized to the problematic hub device itself without negatively affecting the rest of the decentralized distributed computing environment 100.

In implementation, latency and efficiency tests are performed to test the decentralized distributed computing environment 100 implemented using the above-mentioned MQTT protocol. In one test, efficiency of sending two different types of messages in decentralized distributed computing environment 100: command messages and image messages, are profiled. In that test, the same message is sent 1000 times to obtain an average transmission delay to and from a given broker. In that test, a length of all command messages sent is less than 1 KB long. For image transmissions in that test, a resolution of 640×480 pixels in each message is used. A result of that test shows: when the MQTT broker and modules reside on the same device, there is no need for sending and receiving image messages as only the computer vision module consumes these. Therefore, there is no transmission overhead at all; and when command messages are routed through a local MQTT broker to the rest of the decentralized distributed computing environment 100, the overhead is negligible (command message has a measured on average 0.55 ms delay and image message has a on average 5.8 ms delay).

It is worth noting that when a given functional module on a given hub device sends a command to another module, whether connected to the same hub device or not, to schedule a task, it needs to send a command message to the MQTT broker on the given hub device first. The MQTT broker would then forward this message to the target module. Then, when the task completes, the target module would need to send the result back to the MQTT broker, and the MQTT broker forwards this result back to the calling module. In a test, this round trip operation is measure to incur on average 0.55 ms×4=2.2 ms overhead to execute a remote task. Similarly, when an image message is sent from one module to a remote module for processing, the overhead is calculated as (5.8 ms×2)+ (0.55 ms×2)=12.7 ms since images are only sent in the request but not in the response.

It should be understood that the MQTT protocol can be implemented for the decentralized distributed computing environment 100 using any suitable network transport protocols such as TCPv4, TCP v6, and TLS, just to name a few as examples. If network transport security is a requirement, a ssl_dist.conf file can be configured to specify a valid TLS certificate to ensure proper channel encryption.

Attention is now directed back to FIG. 2. With the communication component 204 having been described and illustrated, focus is now directed to functional module component 210. As mentioned above in connection with the decentralized distributed computing environment 100 and the communication component 204, a decentralized architecture is employed for the software system implementing the decentralized distributed computing environment 100. In the decentralized distributed computing environment 100, software or routines for achieving various functional goals or tasks can be run in a distributed manner. In designing this software system, a consideration is an ability to distribute computation to various components in the decentralized distributed computing environment 100 is important to maintain hardware affordability while still retain the ability to solve real-world problems that require cooperation of different algorithms for achieving various functional goals.

For illustrating this design consideration, attention is directed to FIG. 1 again. As can be seen, individual hub devices in decentralized distributed computing environment 100 are connected with local processing devices and remote processing devices mentioned above. If these devices are to be interconnected such that they are can be employed by a user as if they were connected to a "single" system, these devices provide increased processing capabilities as a whole as compared to individually. Thus, the design consideration is to provide an interface to the user to enable the user to be able to use these devices from a single system perspective to achieve various functional goals.

In the decentralized distributed computing environment 100, a given hub device may be referred to as a node. Attention is now directed to FIG. 3 again, an individual node, such as the hub devices #1-#N shown in FIG, is configured with many different modules as mentioned above. For a given module on a given hub device, a set of one or more services are advertised. A given service of the given module is referred to a set of software or routines for achieving one or more logically related tasks. For example, as illustration thus non-limiting, the vision module on hub device #1 include a service called vision_processing service, which may include software or routine for performing various vision_processing tasks such as image capturing, feature obtaining from an input image, just to name a few.

Figure 4:
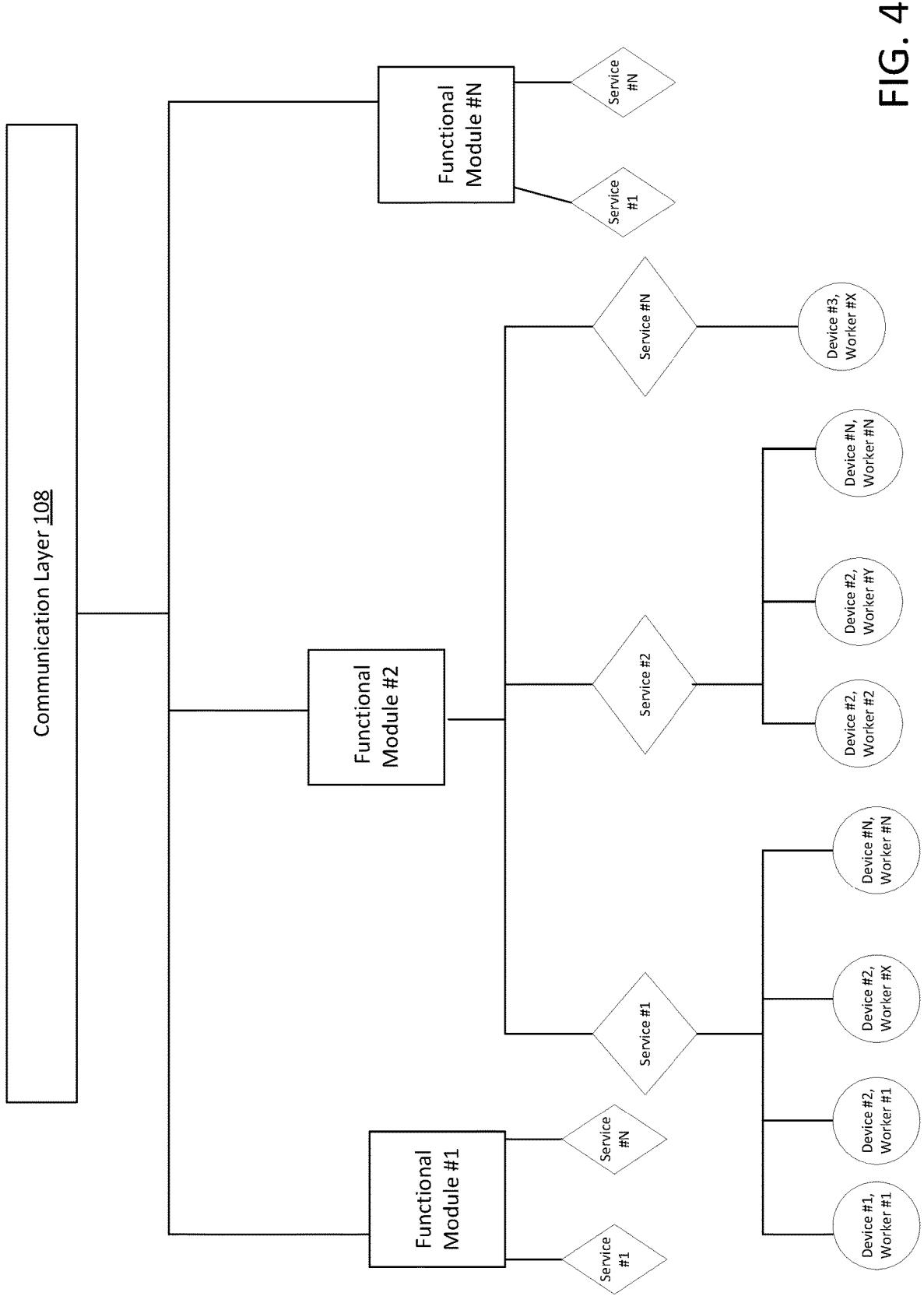
FIG. 4 illustrates an example of module and service view in the decentralized distributed computing environment shown in FIG. 1.

Attention is now directed to FIG. 4, where an example of module and service view in the decentralized distributed computing environment 100 is illustrated. In the example view shown in FIG. 4, as can be seen a functional module, such as functional module #1-#N, has a set of services #1-#N. For example, as illustration thus non-limiting, functional module #1 may be a voice module, functional module #2 may be a vision module, and functional module #N may be a smart home control module. In this example, services in functional module #2 are expanded to illustrate individual services in any given module can have a set of corresponding workers to support the services. That is, although services in functional module #1 and #N are not expanded in this example, it should not be construed that they don't have workers to support them.

Attention is now directed to service #1 for functional module #2 shown in FIG. 4. As can be seen, in this example, this service has worker #1 managed by hub device #1, worker #1 managed by hub device #2, work #X managed by hub device #2 and worker #N hosted by hub device #N. For example, functional module #2 may be a vision module where service #1 is a vision_processing_service, which has a list of workers such as a smart camera (worker #1) connected with hub device #1, another smart camera (worker #1) connected with hub device #2, a security video camera connected to hub device #2 (worker #X), and an image sensor of hub device #N (worker #N). Thus, as can be seen, through the service #1 of functional module #2, these workers scattered around in the decentralized distributed computing environment 100 are logically grouped to provide capabilities to support the service #1 of functional module #2.

In one example implementation, JSON is used to specify a configuration of services and workers for a given functional module. In that implementation, services and workers are contained within the given functional module as shown below. The given functional module configuration file "module_configs.json" defines the services and workers contained in the given functional module. The following is an example of a "vision" module.

```
{
    "vision": {
        "rgb_image_input_worker" : "RGBImageInputWorker",
        "depth_image_input_worker" : "DepthImageInputWorker",
        "video_file_input_worker" : "VideoFileInputWorker",
        "face_detection_worker" : "FaceDetectionWorker",
        "pose_estimation_worker" : "PoseEstimationWorker",
        "opencv_render_worker" : "OpenCVRenderWorker",
        "vision_input_service: {
            "class: VisionInputService",
            "friendly_name": "Vision Input Service",
            "worker_list:" [
                "rgb_image_input_worker",
                "depth_image_input_worker",
                "video_file_input_worker"
            ]
        },
        "vision_processing_service": {
            "class": VisionProcessingService,
            "friendly_name": "Vision Processing Service",
            "worker_list": [
                "face_detection_worker",
```
-continued
```
                "face_recognition_worker",
                "pose_estimation_worker"
            ]
        },
        "vision_render_service" : {
            "class: "VisionRenderService",
            "friendly_name": "Vision Render Service",
            "worker_list": {
                "opencv_render_worker"
            ]
        }
    }
}
```

As can be seen, this vision module manages six different workers and three vision services: "vision_input_service", "vision_processing_service", and "vision_render_service". Each service references the name of its workers in its "worker_list". The attribute name of the workers and services correspond to the Python filenames that contain actual implementations. The attribute value on the right-hand side of a worker declaration corresponds to that worker's Python class name. Each service must contain three sub-attributes: "class", "friendly_name", and "worker_list". The worker list can be empty, but that would essentially disable the service.

Figure 5:
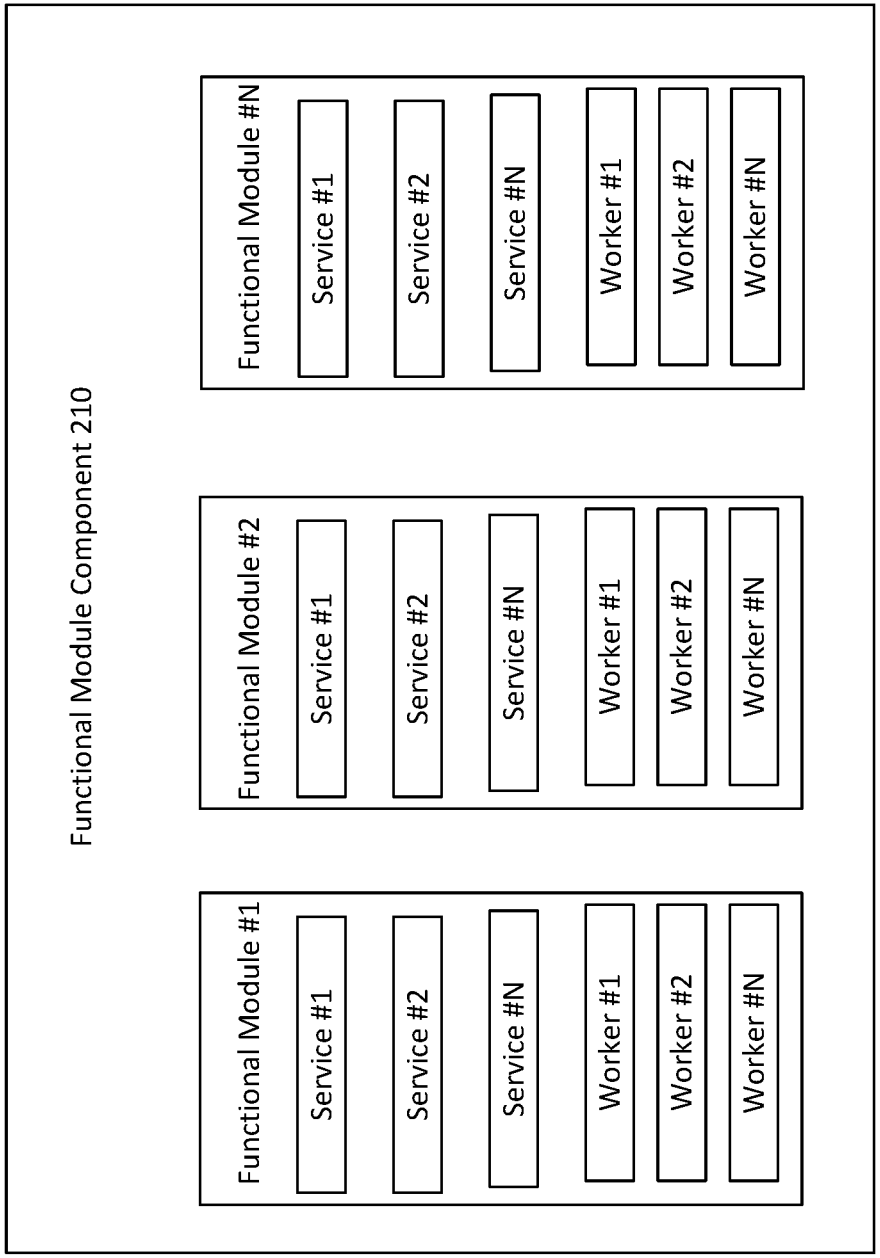
FIG. 5 illustrates one example implementation of a functional module component in accordance with the present disclosure.

In implementation, the functional module component 210 is configured to implement various modules and services such as the example vision module shown above. FIG. 5 illustrates one example implementation of a functional module component 210 in accordance with the present disclosure. As can be seen, the functional module component 210 in this example implements function modules #1, #2 . . . and #N. On a startup of a given hub device, the functional module component 210 on that hub device can create an instance of a given service and its associated workers for a given functional module, for example functional module #1. Worker instances on that hub device are then assigned to a service for task scheduling. Services are responsible for managing the task queue and input/output data. Services also examine the target service that requested the task result. If the target service is itself, it will not send the result to the MQTT broker but cache it locally for immediate use. Services are designed this way to enable the construction of efficient multi-stage pipelines that almost always show up in computer vision applications. Service and worker instances are only destroyed when the given functional module on the given hub device exits.

The load balance component 206 is configured to implement load balancing in the decentralized distributed computing environment 100. In implementation, the load balance component 206 on a given hub device is configured to send heartbeat information to the meshed MQTT brokers in the decentralized distributed computing environment 100. The load balance component 206 on the given hub device is also configured to maintain an up-to-date device map of all available hub devices and their capabilities in the decentralized distributed computing environment. When a node fails or shuts down, the MQTT brokers will prevent tasks from being scheduled to it as it fails to send its heartbeat and consequently causing it to be removed from the device map. Suppose a task is scheduled to a failed device before the device map is updated. In that case, a timeout will occur, which will also cause the device to be removed from the device map and the task rescheduled to another device.

The load balance component 206 is configured to balance the load of the decentralized distributed computing environment 100 by examining the load on individual hub devices.

When a hub device sends heartbeat information, the current load (defined as the number of tasks waiting in the task queue plus the number of tasks currently being processed) is included in the heartbeat. When the task handler 208 schedules a task, it will examine the current device map and find a hub device with the least load. In this way, a simple load-based balancer is implemented by sequentially traversing the entire device map to find the best device (which has the needed worker and with the least load). Even though device load calculated this way does not always accurately reflect a device's CPU and memory pressure, it works well enough in our tests. Other load balancing techniques such as round-robin or statistical methods are contemplated.

The task handler 208 is configured to create a task handler based on a command request received from a client computing device such as the devices 110*a-n* shown in FIG. 1. The created task handler is capable of facilitating a task requested by the command request to be performed by a worker in the decentralized distributed computing environment 100. In implementation, the task handler 208 can be configured to receive the command request via the communication component 204, for example through MQTT. The task handler created for a particular command can include information indicating which worker in the decentralized distributed computing environment 100 is to work on the task. Below is an example of a task created for a command:

received such a request, the task handler 208 can call the load balance component 206 to provide information indicating which hub device(s) in the decentralized distributed computing environment 100 has the requested worker, and their load information. Based on such information, the task handler 208 can create a task handler to perform the task, e.g., face_detection_handler, in the request.

Still can be seen from the example above is that the task handler 208 can also handle a request from the user to create a task handler that takes an output of another task handler as an input. This is shown above by the face_detection_handler, which takes the output of the rgb_image_handler created above as an input. Similarly, the face_recognition_handler takes output of the face_image_handler and face_detection_handler as input.

In implementation, the task handler created by the task handler 208 can include at least three pieces of information, an identification of the task to performed, an MQTT channel to which a result is to be published, and an identification of a worker that produces the result. As shown, user commands can use task handlers as input in place of actual data.

A particular task handler created by the task handler 208 can cause a particular service to schedule the task specified by the particular task handler to be performed. In the event, the task parameters include one or more task handlers rather than actual data, the service will hold the task in a special

```
# get specific workers for camera input and rendering
camera_worker = CURTCommands.get_worker{"charlie.local/vision_input_service/
rgb_image_input_worker"}
render_worker = CURTCommands.get_worker{"charlie.local/vision_render_service/
opencv_render_worker")
# perform face detection and recognition using any available worker on the network
rgb_image_handler = CURTCommands, request (camera_worker, params = {"get_rgb_frame"])
face_detection_handler = CURTCommands, request("face_detection_worker", params =
rgb_image_handler)
face_recognition_handler = CURTCommands, request("face_recognition_worker", params =
(rgb_image_handler, face_detection_handler])
# render the image frame and face recognition result to a specific window
rendering_param = {
    "window_name"; "TestWin",
    "input_handlers": [rgb_image_handler, face_recognition_handler]
    }
rendering_handler = CURTCommands.request(render_worker, params = rendering_param)
# wait for the rendering to finish before moving on to the next frame
_ = CURTCommands. get_result(rendering_handler)
```

In the above example, it can be seen there may be two ways for a user to request a worker in the decentralized distributed computing environment 100 to perform user defined tasks via command request (e.g. CURTCommand.request). The first way, as can be seen, is that the user is enabled to specifically select a worker on a particular hub device in the decentralized distributed computing environment 100. For example, as shown, "camera_worker" is selected by a user to be an instance of "rgb_image_input_worker" within the "vision_input_service" on the "charlie.local" hub device. The "render_worker" is selected similarly.

The second way is for the user to generally request a worker in the decentralized distributed computing environment 100 to perform a task. In the above "face_detection_handler" example, this is illustrated above by requesting a "face_detection_worker" to perform a task. As can be seen, that request does not specify a particular hub device. For satisfying this type of request, the task handler 208 is configured to determine an appropriate worker using the load balance component 206. For example, once queue until the output of those task handlers have been published to the MQTT channel specified in the task handler before scheduling it on a task queue. In the meantime, the service will process other tasks in the task queue without being held up waiting for data. In this way, the user can use the command "get_result" to pause the execution of the current process until the actual result is published to the task handler's MQTT channel. While waiting, the middleware yields processing resource(s) such as a processor to the current process until the MQTT broker notifies it that the required computation is completed.

This command-based design is very useful in synchronizing all the computations before advancing to process the next frame. Implementation of frame rate locking to prevent a jitter in rendering results is also contemplated. This command-based design allows developers to code their applications in a simple-to-understand sequential manner while still retaining all the benefits of asynchronous programming paradigms. The task handlers created by the task handler 208 represent a distributed thread-safe alternative to Python's asyncio.

Figure 6:
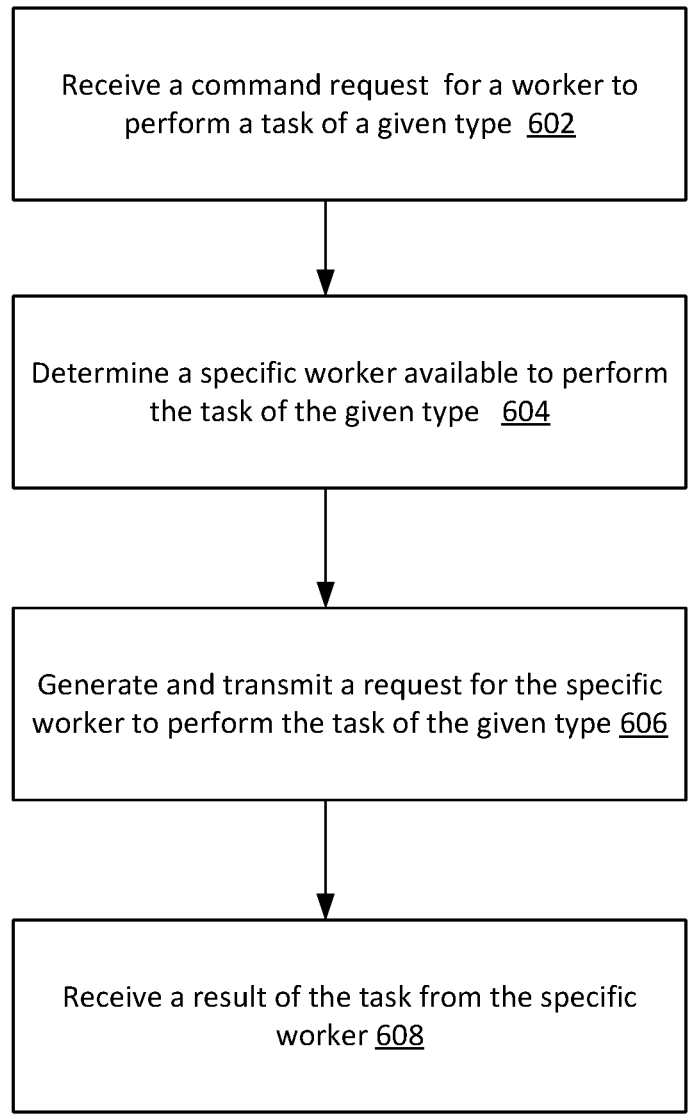
FIG. 6 illustrates an example method of performing a task in a distributed computing environment shown in FIG. 1.

With an example processor implementing a software stack of middleware facilitating the decentralized distributed computing environment 100 having been described and illustrated, attention is now directed to FIG. 6, where an example method of performing a task in a distributed computing environment is illustrated. The operations of method 600 presented below are intended to be illustrative. In some embodiments, method 600 may be accomplished with one or more additional operations not described and/or without one or more of the operations discussed. Additionally, the order in which the operations of method 600 are illustrated in FIG. x and described below is not intended to be limiting.

In some embodiments, method 600 may be implemented by a device including one or more of the processor, such as the ones shown in FIG. 6. The device may include a digital processor, an analog processor, a digital circuit designed to process information, an analog circuit designed to process information, a state machine, and/or other mechanisms for electronically processing information. The device may execute some or all of the operations of method 600 in response to instructions stored electronically on an electronic storage medium. The device may include one or more components configured through hardware, firmware, and/or software to be designed for execution of one or more of the operations of method 600.

Figure 7:
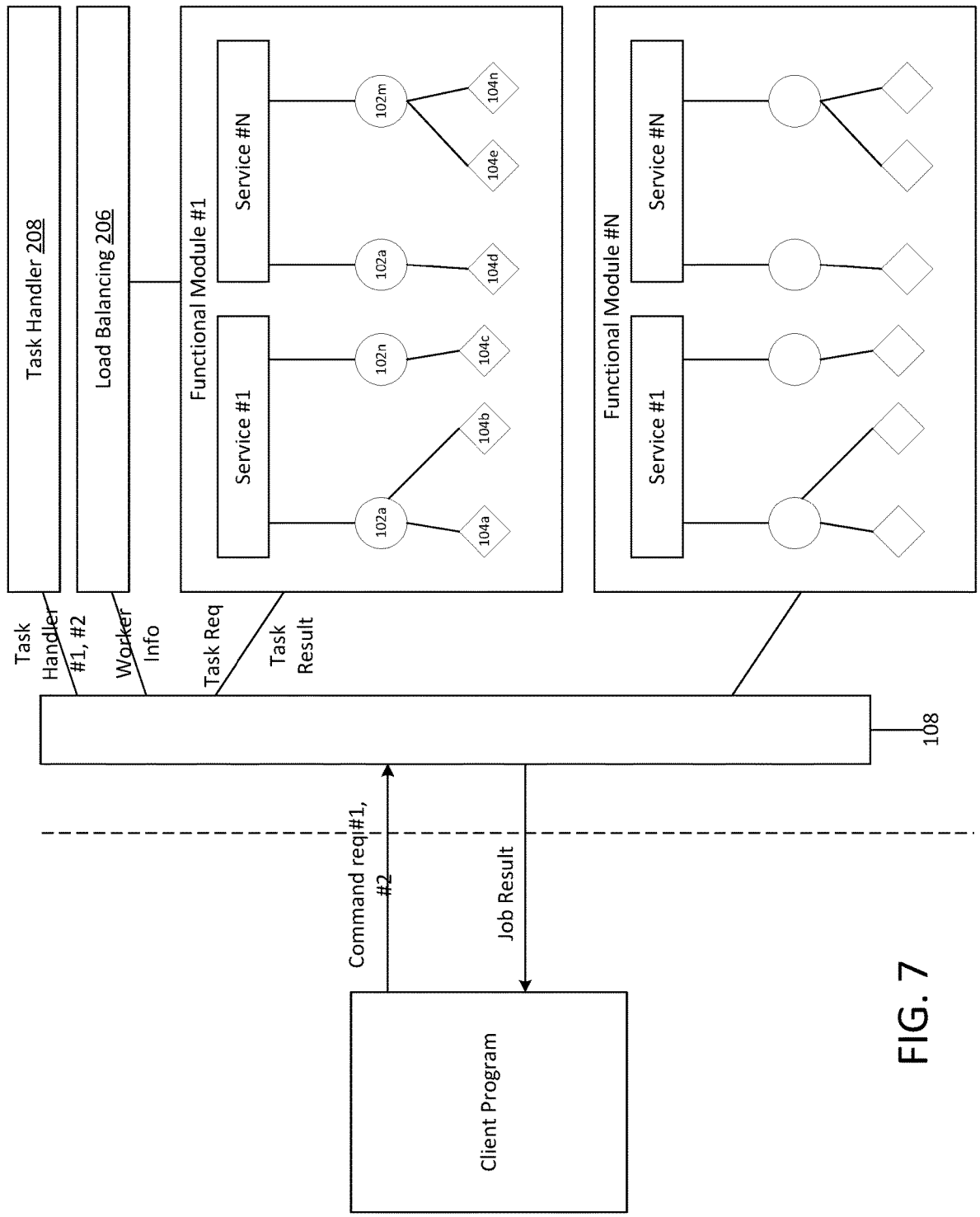
FIG. 7 illustrates an example implementation of operations shown in FIG. 6.

At a 602, a command request is received from a client, which requests a task to be performed by a worker in the decentralized distributed computing environment 100. An example of this operation is illustrated in FIG. 7. As can be seen there, command request #1 or #2 is received from a client program implemented on a client computing device such as 110a, b or n shown FIG. 1. For example, as illustration thus non-limiting, command request #1 may be a command request for a task handler to perform a task of acquiring an image of a user, and command request #2 may be a command request to perform a task of detecting a face of the user based on an output of the task handler created for command request #1. Examples of command requests that can be received at 602 are described above. In various implementation, 602 can be implemented by a communication component the same as or substantially similar to the communication component 204 described and illustrated herein.

At 604, a specific worker is determined to be available to perform the task. In some implementation, for achieving 604, a task handler can be created. Referring to FIG. 7, as can be seen there, after receiving the command request at 602, the task handler 208 can determiner whether the command request includes information indicating a specific worker is to be used or just request any available worker to perform the requested task. In the later case, the task handler 208 can request status and load information from the load balance component 206 to understand which specific workers in the decentralized distributed computing environment 100 are capable of performing the requested task and their current load situation. Based on such information, a specific worker (connected with a specific hub device) is determined to be available to perform the requested task. In various implementation, 604 can be implemented by a task handler the same as or substantially similar to task handler 208 described and illustrated herein.

At 606, a request is generated and transmitted to the specific worker determined at 604 to perform the task. In implementation, the request generated at 606 can be in a form of task handler described and illustrated herein. As mentioned herein, the task handler can include information indicating an identification of the worker, an identification of the requested task, and an identification of a MQTT channel to which a result of the task may be published. Such a task handler creates a request to the specific worker to perform the task and publish the result through MQTT. FIG. 7 shows that task request is generated and transmitted to a specific worker (for example 104a on hub device 102a) within the service #1 at functional module #1. As mentioned above, the task request (for example a task handler) can be transmitted to a MQTT broker in the decentralized distributed computing environment 100 such that the specific worker (e.g., 104a) can receive the task request via the MQTT. In various implementation, 606 can be implemented by a task handler the same as or substantially similar to task handler 208 described and illustrated herein.

At 608, a result of the task is received from the specific worker. In various implementation, 608 can be implemented by a task handler the same as or substantially similar to task handler 208 described and illustrated herein.

Figure 8:
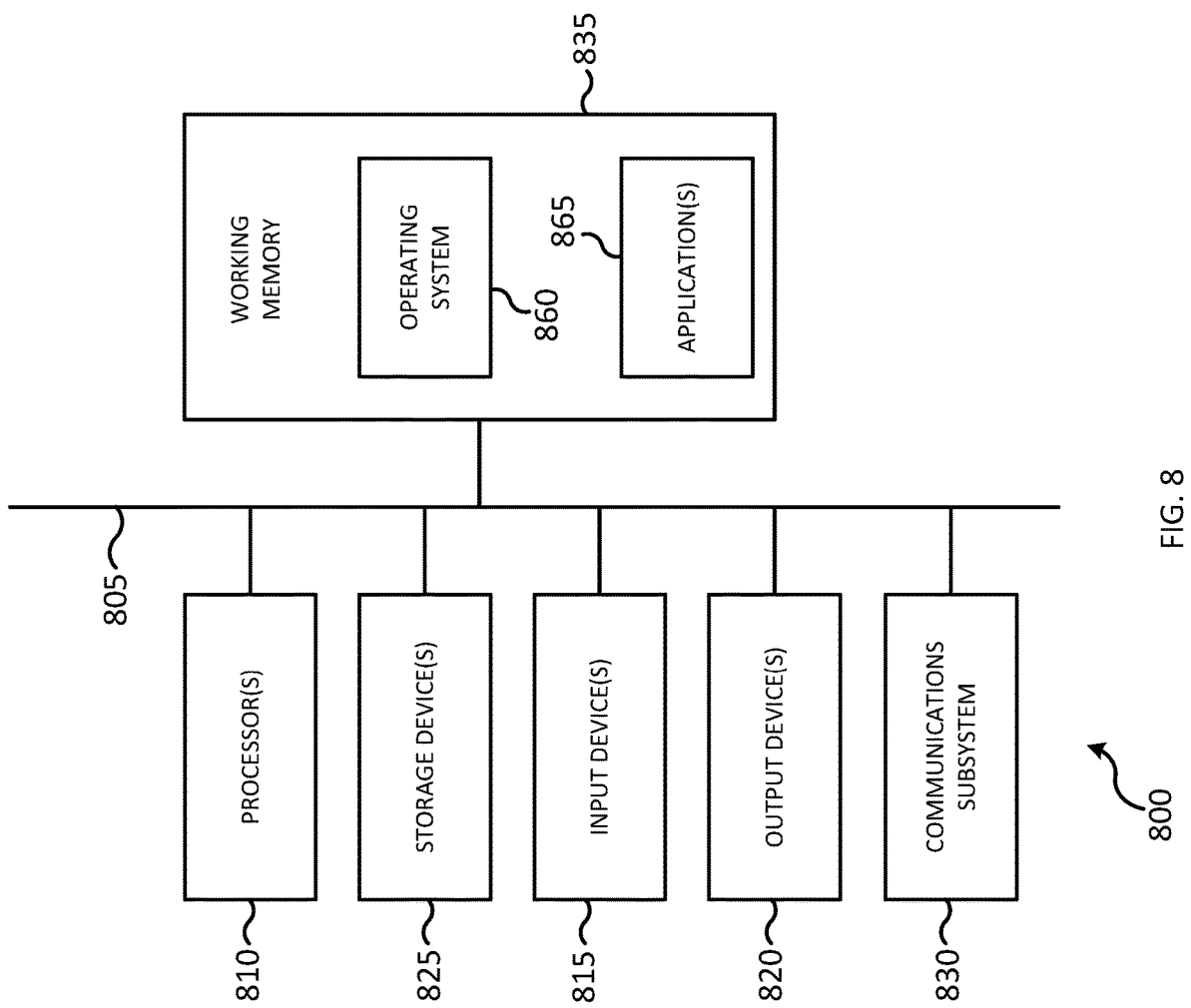
FIG. 8 illustrates a simplified computer system that can be used to implement various embodiments described and illustrated herein.

FIG. 8 illustrates a simplified computer system that can be used to implement various embodiments described and illustrated herein. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 860, device drivers, executable libraries, and/or other code, such as one or more application programs 865, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 860 and/or other code, such as an application program 865, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium" as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for performing a task in a decentralized distributed computing environment comprising a hub device operatively connected with a worker component, the method being implemented in an electronic processor, and the method comprising:
   receiving a command request from a client, the command request requesting to perform the task;
   determining the worker component is available to perform the task;
   allocating a task handler for performing the task, the task handler including information indicating an identification of the worker component;
   generating a task request comprising the task handler;
   transmitting the task request to the worker component via the hub device;
   receiving a task result in the task handler from the work component; and
   making the task handler available for use for one or more subsequent commands from the client.

2. The method of claim 1, wherein the command request is a first command request requesting to perform a first task, the hub device is a first hub device, the task handler is a first task handler, the task request is a first task request and the task result is a first task result, the worker component is a first worker component; and, wherein the distributed computing environment further comprises a second hub device operatively connected to a second worker component, and the method further comprises:
   receiving a second command request from the client, the second command requesting to perform a second task;
   determining the second worker component is available to perform the second task;
   allocating a second task handler for performing the second task, the second task handler including information indicating an identification of the second work component;
   generating a second task request comprising the second task handler;
   transmitting the second task request to the second worker component; and
   returning a second task result from the second work component to the client, wherein the second task result is achieved by the second work component using the first task result in the first task handler.

3. The method of claim 1, wherein the method further comprises:
   managing one or more functional modules including a first functional module comprising a first service; and, wherein the command request specifies the task is facilitated by the first service in the first functional module, and wherein determining the worker component is available to perform the task comprises:
   obtaining information indicating a set of one or more worker components configured to perform the first service, wherein the worker component is a first worker component in the set; and
   determining that the first worker component in the set is available to perform the task based on a load of each worker component in the set.

4. The method of claim 1, wherein the hub device is a first hub device, and the method further comprises:
   discovering a second hub device is available in the distributed computing environment, wherein the second hub device is operatively connected to a second worker component.

5. The method of claim 4, further comprising obtaining information indicating the second worker component is no longer connected to the second hub device.

6. The method of claim 1, further comprising:
   storing a routine configured to facilitate the performance of the task, and wherein the task result is achieved by the first worker component using the routine.

7. The method of claim 1, wherein the hub device is a first hub device; and, wherein the electronic processor is implemented in a second hub device separate and distinct from the first hub device.

8. The method of claim 1, wherein the task request is transmitted to the worker component via a mesh network, and wherein the hub device is a first hub device connected to the mesh network.

9. The method of claim 1, wherein the mesh network is implemented using a MQ Telemetry Transport (MQTT) protocol.

10. A device for performing a task in a decentralized distributed computing environment the device comprising an electronic processor configured to executing computing programs such that when the computing programs are executed, the processor is caused to perform:
- receiving a command request from a client, the command request requesting to perform the task;
- determining a worker component is available to perform the task, the worker component connecting to a hub device;
- allocating a task handler for performing the task, the task handler including information indicating an identification of the worker component;
- generating a task request comprising the task handler;
- transmitting the task request to the worker component via the hub device;
- receiving a task result in the task handler from the work component; and
- making the task handler available for use for one or more subsequent commands from the client.

11. The device of claim 10, wherein the command request is a first command request requesting to perform a first task, the hub device is a first hub device, the task handler is a first task handler, the task request is a first task request and the task result is a first task result, the worker component is a first worker component; and, wherein the distributed computing environment further comprises a second hub device operatively connected to a second worker component, and the processor is further caused to perform:
- receiving a second command request from the client, the second command requesting to perform a second task;
- determining the second worker component is available to perform the second task;
- allocating a second task handler for performing the second task, the second task handler including information indicating an identification of the second work component;
- generating a second task request comprising the second task handler;
- transmitting the second task request to the second worker component; and
- returning a second task result from the second work component to the client, wherein the second task result is achieved by the second work component using the first task result in the first task handler.

12. The device of claim 10, wherein the processor is further caused to perform:
- managing one or more functional modules including a first functional module comprising a first service; and, wherein the command request specifies the task is facilitated by the first service in the first functional module, and wherein determining the worker component is available to perform the task comprises:
- obtaining information indicating a set of one or more worker components configured to perform the first service, wherein the worker component is a first worker component in the set; and
- determining that the first worker component in the set is available to perform the task based on a load of each worker component in the set.

13. The device of claim 10, wherein the hub device is a first hub device, and the processor is further caused to perform:
- discovering a second hub device is available in the distributed computing environment, wherein the second hub device is operatively connected to a second worker component.

14. The device of claim 12, wherein the processor is further caused to perform: obtaining information indicating the second worker component is no longer connected to the second hub device.

15. The device of claim 10, wherein the processor is further caused to perform:
- storing a routine configured to facilitate the performance of the task, and wherein the task result is achieved by the first worker component using the routine.

16. The device of claim 10, wherein the hub device is a first hub device; and, wherein the device is a second hub device separate and distinct from the first hub device.

17. The device of claim 10, wherein the task request is transmitted to the worker component via a mesh network, and wherein the hub device is a first hub device connected to the mesh network.

18. The device of claim 10, wherein the mesh network is implemented using a MQ Telemetry Transport (MQTT) protocol.

* * * * *